United States Patent Office 2,701,320
Patented Feb. 1, 1955

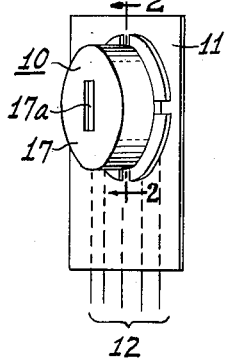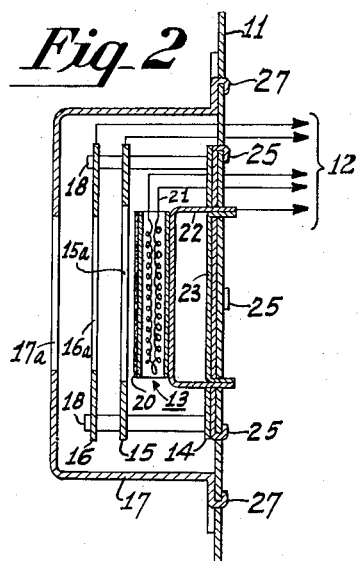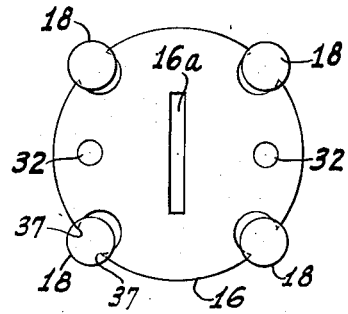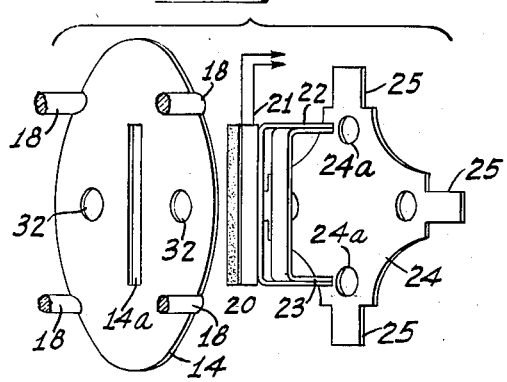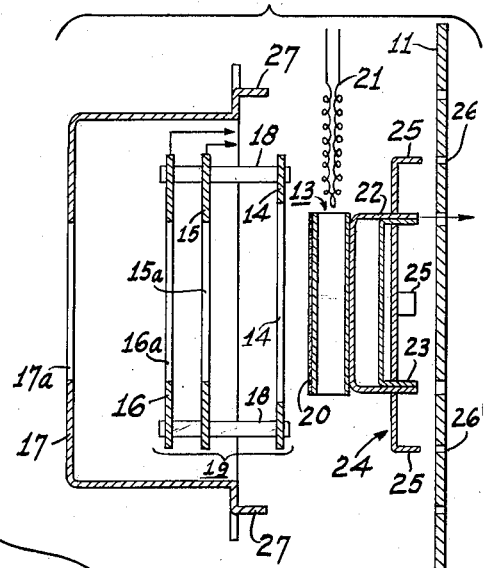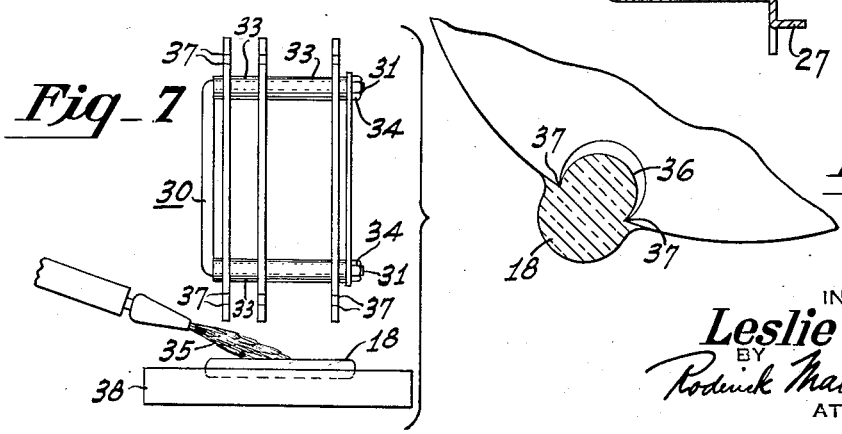
INVENTOR
Leslie Kovach
BY
Roderick Malcolm
ATTORNEY

2,701,320

ELECTRON GUN STRUCTURE AND METHOD FOR MAKING THE SAME

Leslie Kovach, Lancaster, Pa., assignor to Radio Corporation of America, a corporation of Delaware Application May 26, 1950, Serial No. 164,588

7 Claims. (Cl. 313—82)

The present invention relates to the art of mounting metal electron gun parts on glass supports.

In the prior art, metal electron-gun parts are usually attached to glass side rods by separately-formed support elements. These elements, which usually are small pins, are fastened to the gun parts to form sub-assemblies which thereafter are attached to the rods. More particularly, they are welded to the gun parts on their one ends and then have their other ends forced into the glass supporting rods while the latter are in a molten condition. A single pin is usually employed at each support point and each pin is held mechanically captive in a glass rod by the fact that it has an enlargement, such as a spatulation, at its end which is embedded therein.

This type of support has a number of disadvantages. Several of the disadvantages arise from the necessity of welding the pins (or similar support elements) to the gun parts. This adds to the complexity of the gun; it tends to distort the shape of the parts, particularly when they are small and fragile; and it increases the cost of the gun. In addition, since the pins are usually attached so as to protrude from the small parts in radial directions, their use frequently increases the overall diameter of the gun structure. Other disadvantages arise from the use of a single pin at each support point and from the manner in which it is attached to a glass rod. Since each pin is attached to a rod by being captive within it, the rod must be fairly thick inasmuch as the tensile strength of the glass is relatively low.

Accordingly, it is an object of the present invention to provide a mounting for metal electron gun parts on glass side rods in which the support elements which engage the rods are formed integrally in the parts themselves.

It is a further object to provide mountings of the kind referred to above in which there are two such elements at each support point formed so that a glass side rod may be held captive therebetween.

It is another object to provide an electron gun assembly in which a number of metal parts are mechanically attached to a number of glass side rods in the manner set forth in the preceding paragraph to form a structure the rigidity of which does not depend preponderantly on the tensile strength of the glass at the points where the gun parts are attached to the rods.

It is another object to devise an improved electron gun in which a number of the component parts are mounted in a novel manner according to the present invention to produce an unusually compact structure.

In general, the above objects are attained by forming each of the gun parts to include as integral elements pairs of support elements at the respective support points between each pair of which a glass rod may be forced while in a molten state to become captive therebetween. Thus the strength of each connection to a glass rod will be a function of the tensile strength of the metal part and of the strength of the glass under compression rather than of its strength under tension.

In the drawing:

Fig. 1 is an isometric view of an electron gun embodying the present invention;

Fig. 2 is a transverse sectional view of the gun shown in Fig. 1, the section being along the line 2—2 therein;

Fig. 3 is an exploded view of the structure shown in Fig. 2;

Fig. 4 is an isometric view of a number of the parts comprised in the gun shown in Figs. 1–3;

Fig. 5 is a top view of a sub-assembly of the gun shown in Figs. 1–3;

Fig. 6 is an enlarged sectional view of a portion of the sub-assembly shown in Fig. 5; and Fig. 7 illustrates the manner in which the sub-assembly of Fig. 5 is assembled.

Fig. 1 shows the output end of an electron gun 10 which is mounted on a flat sheet of mica 11. A source of heater current and sources of beam accelerating-and-focusing potentials (none of which is shown and none of which need be of any special kind according to the present invention) may be respectively connected to appropriate electrodes of the gun 10 over a group of leads 12.

The particular gun 10 shown herein for the purposes of illustration is adapted to produce a ribbon-shaped electron beam, i. e., a beam of rectangular cross section. However, it is possible to make electron guns which comprise the novel constructional features described herein and which are adapted to produce beams of other shapes. Guns like the particular gun 10 shown herein are employed as the modulating means for frequency-modulated magnetrons such as those described in the co-pending application of Lloyd P. Smith, Serial No. 563,732 which was filed November 16, 1944, now abandoned, and assigned to the same assignee as the present application. In such a magnetron, the path of the beam is through a cavity resonator (which is included in the magnetron or is coupled to it) and in the direction of the flux lines of a magnetic focusing field. Frequency modulation is achieved by modulating either the current density of the beam or the transit times of its electrons.

The gun 10 comprises a number of electrodes including a cathode 13, a base plate 14, a control grid 15, an accelerating apertured plate 16 and a decelerating shield cap 17. As best shown in Fig. 3, the base plate 14, the grid 15 and the apertured plate 16 are all attached to a number of glass side rods 18 to form a unitary sub-assembly 19. This sub-assembly, the construction of which will be more fully described below, embodies the principal feature of the present invention.

Each of the electrodes in the sub-assembly 19 has a central rectangular aperture 14a, 15a, 16a, and 17a respectively. The central apertures of the grid 15 and the accelerating plate 16 (15a and 16a) are of a similar size and shape which is suitable for forming the beam and determining its cross-sectional size. On the other hand, the aperture 14a of the base plate 14 need merely be large enough and appropriately shaped to permit the cathode 13 to be inserted through it in the assembly of the gun. The central apertures are formed by being punched out when these gun electrodes are "blanked," i. e., stamped out of flat sheet-metal stock. In this single inexpensive operation for each electrode, the following is accomplished: the circular perimeter of the electrode is formed; the central aperture, 14a, 15a, or 16a as the case may be, is punched out; alignment holes 32 (useful in a manner to be described below for receiving an alignment mandrel) are punched out; and pairs of claw-shaped support elements 37 defining notches are formed at different peripheral points at each of which the element will be attached to a glass side rod 18.

The cathode 13 is in the form of a hollow rectangular nickel tube which carries an emissive coating 20 on its upper surface and a heater winding 21 within its hollow interior. The heater winding 21 may be of a conventional type. For example, it may be non-inductively wound to produce a minimum resultant magnetic field when passing an alternating heater current and it may be coated with a suitable refractory insulating compound such as aluminum oxide. The bottom of cathode 13 is welded to a narrow strip of metal 22 such as stainless steel or nickel, each end of which is bent away from the cathode to form a right angle therewith. Thus the strip 22 has the shape of an inverted U. The legs thus-formed by the bent-down ends of strip 22 carry between their inner surfaces a slightly narrower but similarly bent strip 23 with each pair of juxtaposed legs spot-welded together.

A cathode plate 24, as is best shown in Fig. 4, is provided with a pair of holes 24a properly spaced to receive the parallel legs of the adjoined U-shaped strips 22, 23. Thus, when these legs are pushed through these holes as far as possible, the sub-assembly comprising the strips 22, 23, and the cathode 13 will rest against the plate 24 and the cathode will be supported parallel thereto with a predetermined spacing therefrom. The strip 23 is spot welded to the cathode plate 24 so that the cathode 13, the strips 22, 23 and the plate 24 become a unitary structure.

If desired the bent-down legs of the U-shaped strips 22, 23 may be spot welded as the last step in forming this unitary structure, i. e. after strip 23 has been welded to plate 24. This unitary structure is joined to the sub-assembly 19 by inserting the cathode 13 through the base plate 14, i. e. through its rectangular aperture 14a, and by spot welding the cathode plate 24 thereto. The resulting structure is attached to the mica sheet 11 by inserting four tabs 25 through a number of holes 26 in the mica sheet 11 and turning over their ends as shown in Fig. 1.

The tabs 25 are integral parts of the plate 24. After the initial blanking all of a plate 24 including its tabs 25 may still be flat, as shown in Fig. 4. If so, the forming of the plate is completed by bending down the tabs 25 at right angles. On the other hand, if desired, the bending of the tabs may be accomplished as part of the blanking operation. To complete the gun, the decelerating shield cap 17 is placed over the entire group of other electrodes and fastened to the mica sheet 11 as shown at 27 (Fig. 2) by a constructional expedient which has already been described.

Sub-assembly 19 may be formed in a manner best illustrated by Figs. 5, 6 and 7 as follows: The base plate 14, the grid 15 and the apertured plate 16 are placed on a mandrel 30 as shown in Fig. 7. The mandrel comprises two rods 31 which are properly spaced to pass through similar pairs of alignment holes 32 in each of these electrodes. The electrodes are placed on the mandrel 30 one at a time so that after each one is placed thereon a pair of spacers 33 can be slipped over the rods 31 to assure a desired inter-electrode spacing. When all of the electrodes are on the mandrel 30 they and the spacers 33 are held tightly together by some appropriate means such as those shown at 34. A glass side rod 18 is laid in a groove in a suitable holder such as a metal plate or a refractory brick 38 and is heated with a gas flame 35 until it is softened. The clamped-together group of electrodes is urged against the glass rod 18 while one row of three pairs of claw-shaped support elements 37 is in alignment therewith. The glass rod will be forced between one pair of claws 37 of each electrode. Though small grooves will be opened in opposite sides of the rod at each support point to make way for the claws, they will close because of the surface tension of the glass. For the same reason the portion of the glass which is forced between the supporting elements at each support point will draw itself into a bead as shown at 36 in Fig. 6. As a result, each pair of supporting elements (or "claws") 37 will be captive in a pair of oppositely located indentations in the glass rod while at the same time the rod will be captive between the claws. Thus the claws will not pull out even if the mechanical joint loosens due to shrinkage of the glass when it cools. It is not necessary that the metal parts be oxidized or in any other way prepared to be "wet" by the molten glass or that the glass be softened to a very considerable extent to accomplish the same purpose. That is to say, each connection of an electrode to a side rod is of a mechanical nature and is not dependent upon any fusion between the glass and the metal. A structure made like the sub-assembly 19 herein with at least three spaced flat electrodes each attached to at least three spaced glass side rods is unusually rigid even though no single one of the connections between an electrode and a side rod is formed with an actual fusion between the glass and the metal.

After the sub-assembly 19 has been completed, it is removed from the mandrel 30; the spacers 33 are allowed to fall out; and the assembly of the entire gun may proceed in the manner already described.

It is not an essential part of the invention to operate the gun 10 in any particular manner. Instead, it may be operated in any way which is appropriate for and in accordance with the requirements of the device in which it is utilized. For example, in utilizing a gun in a magnetron of the kind described above, the decelerating shield cap 17 may be electrically connected to the resonator through which its beam is directed; the accelerating apertured plate 16 may be at a somewhat higher potential than said resonater (such as 300 volts higher); the cathode 13 may be about 70 volts below the resonator potential, e. g., at −70 volts if the resonator is grounded; and the control grid 15 should be at an appropriate potential with respect to the cathode to establish a suitable bias for the kind of modulation which is used. When the gun is thus employed, the beam is first accelerated to the potential of the plate 16, this being desirable for attaining maximum cathode emission and for reducing space charge effects. Thereafter, the beam is decelerated so that the average potential of the electrons in passing through the tuning-and-modulating resonator is equal to the potential difference between the cathode 13 and the modulating resonator.

However, the variety of possible uses for an electron gun built according to the present invention, and of ways in which they may be operated in those uses is not limited by any of the characterizing features of the present invention.

I claim:

1. An electrical apparatus comprising a metal electrode having a pair of support elements at a position on its perimeter, each of said elements being formed with a pointed portion directed toward the corresponding pointed portion of the other across a space for receiving a glass side rod, and a glass side rod held captive between said pointed portions and having indentations in which said pointed portions are captive.

2. An electrical apparatus comprising a plurality of metal electrodes each formed with a plurality of pairs of support elements at different positions on its perimeter, said pairs of support elements being of the kind set forth in claim 1, corresponding pairs of support elements for the plurality of electrodes being at such positions on the perimeters thereof that when the electrodes are positioned in a predetermined cooperative relationship to each other said corresponding pairs of elements are aligned along an axis for the attachment of a glass side rod, and a plurality of glass side rods each attached to each of said electrodes along a different one of said axes of alignment, each connection between a glass rod and a pair of support elements of said electrode being of the kind set forth in claim 1.

3. An electron gun comprising a plurality of flat electrodes each electrode having a plurality of notches, glass side rods shaped through corresponding notches in said electrodes and in intimate contact with the perimeters of said notches, a cathode connected to one of said electrodes and adapted to emit electrons along an axis extending through a number of said electrodes, each of said last mentioned electrodes having an electron-beam-influencing aperture positioned along said axis, means connectable to a source of heater current for heating said cathode and means for connecting said last mentioned electrodes to sources of polarizing potentials, said corresponding notches having openings of a given size, said glass side rods each having a diameter larger than said opening while the portions thereof in said notches are of reduced diameter and conform to the shape of said notches.

4. An electron gun as in claim 3 and including a cap-shaped electrode formed to surround at least part of the beam-output end of said sub-assembly, said cap-shaped electrode having an aperture to pass the beam of electrons.

5. An electron gun comprising a plurality of flat circular metal electrodes of substantially the same diameter, each formed with a plurality of pairs of claw-shaped support elements at substantially equally spaced locations around its perimeter, the support elements of each pair facing each other across a space for receiving a glass side rod, the spacings between corresponding adjacent pairs of support elements as measured around the perimeter of the different electrodes being substantially equal, the electrodes being parallel and so positioned with respect to each other that said corresponding pairs of support elements of the different electrodes are in alignment along axes perpendicular to the support elements, and a plurality of glass side rods each attached to each of said electrodes along one of said axes, each glass rod at each point of attachment to an electrode being held captive between a pair of said support elements and having a pair of indentations in which said pair of support elements are held.

6. The method of constructing an electron gun comprising a plurality of spaced electrodes, each electrode having notches of a given width in peripheral portions thereof, said method comprising alining said electrodes in spaced relation with said notches of the electrodes alined, inserting a soft glass rod-shaped member having a diameter larger than said given width into said alined notches, and allowing said rod-shaped member to harden and thereby maintain said electrodes in spaced relation with a portion of said rod-shaped member having reduced thickness engaging the wall of said notches.

7. The method of constructing an electron gun comprising a plurality of spaced electrodes each electrode having recesses formed in the periphery thereof with the openings of said recesses having a predetermined size, said method comprising alining said electrodes in spaced relation with said recesses of the electrodes alined, inserting soft glass rods, each having a diameter larger than the size of said openings, one into each group of alined recesses through said openings with recess defining portions of said electrodes cutting through portions of said rods, and allowing the cut portions of said rods to reunite and said rods to harden and thereby maintain said electrodes in spaced relation.

References Cited in the file of this patent

UNITED STATES PATENTS

| | | |
|---|---|---|
| 1,877,431 | Swanson | Sept. 13, 1932 |
| 2,111,231 | Von Ardenne | Mar. 15, 1938 |
| 2,174,853 | Bowie | Oct. 3, 1939 |
| 2,183,309 | Flechsig et al. | Dec. 12, 1939 |
| 2,194,547 | Haines | Mar. 26, 1940 |
| 2,230,825 | Brett | Feb. 4, 1941 |
| 2,429,824 | Koch et al. | Oct. 28, 1947 |
| 2,472,766 | Woodbridge | June 7, 1949 |
| 2,523,099 | De Gier | Sept. 19, 1950 |
| 2,559,526 | Van de Graaff | July 3, 1951 |